United States Patent
Sadamura

(10) Patent No.: US 12,522,212 B2
(45) Date of Patent: Jan. 13, 2026

(54) VEHICLE CONTROL DEVICE

(71) Applicant: Honda Motor Co., Ltd., Tokyo (JP)

(72) Inventor: Satoshi Sadamura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 74 days.

(21) Appl. No.: 18/614,732

(22) Filed: Mar. 24, 2024

(65) Prior Publication Data

US 2024/0336263 A1     Oct. 10, 2024

(30) Foreign Application Priority Data

Apr. 7, 2023 (CN) .......................... 202310365643.5

(51) Int. Cl.
    *B60W 30/16*     (2020.01)

(52) U.S. Cl.
    CPC ....... *B60W 30/162* (2013.01); *B60W 2520/10* (2013.01); *B60W 2554/4041* (2020.02); *B60W 2554/4042* (2020.02); *B60W 2555/60* (2020.02); *B60W 2720/10* (2013.01)

(58) Field of Classification Search
    CPC ............. B60W 30/162; B60W 30/146; B60W 30/143; B60W 2520/10; B60W 2554/4041; B60W 2554/4042; B60W 2555/60; B60W 2720/10; B60K 31/00; B60K 2031/0091
See application file for complete search history.

(56) References Cited

U.S. PATENT DOCUMENTS

| | | | | |
|---|---|---|---|---|
| 7,894,964 | B2* | 2/2011 | Murayama | F16H 63/502 477/109 |
| 9,745,722 | B2* | 8/2017 | Monden | B60L 7/26 |
| 2008/0255738 | A1* | 10/2008 | Murayama | F02D 41/023 701/54 |
| 2008/0255739 | A1* | 10/2008 | Murayama | F02D 41/023 701/54 |
| 2016/0201798 | A1* | 7/2016 | Kikkawa | F16H 61/662 477/44 |

FOREIGN PATENT DOCUMENTS

| | | |
|---|---|---|
| JP | 2013103663 | 5/2013 |
| JP | 2018047718 | 3/2018 |
| JP | 2018065503 | 4/2018 |
| JP | 2019054746 | 4/2019 |
| JP | 2020179698 | 11/2020 |
| KR | 20180034876 | 4/2018 |

OTHER PUBLICATIONS

"Notice of Reasons for Refusal of Japan Counterpart Application", issued on Feb. 26, 2025, with English translation thereof, p. 1-p. 14.

* cited by examiner

Primary Examiner — Russell Frejd
(74) Attorney, Agent, or Firm — JCIPRNET

(57) ABSTRACT

The disclosure provides a vehicle control device, including: an input part, configured to change a setting of a speed of a vehicle through a rotation operation of a driver; and a control part, configured to change the speed of the vehicle based on an input result of the input part. When the input result of the input part is greater than or equal to a prescribed time, or greater than or equal to a prescribed speed, or greater than or equal to a prescribed amount, the control part changes a vehicle speed to a second speed set to a vehicle speed greater than or equal to a first speed.

7 Claims, 4 Drawing Sheets

VEHICLE CONTROL DEVICE

CROSS-REFERENCE TO RELATED APPLICATION

This application claims the priority benefit of China application serial no. 202310365643.5, filed on Apr. 7, 2023. The entirety of the above-mentioned patent application is hereby incorporated by reference herein and made a part of this specification.

BACKGROUND

Technical Field

The disclosure relates to a vehicle control device.

Description of Related Art

In recent years, efforts to provide access to sustainable transportation systems that also take into account those in disadvantaged positions among transportation participants have been active. In order to achieve the above-mentioned purpose, research and development has been committed to further improve the safety or convenience of transportation through research and development related to autonomous driving technology.

The adaptive cruise control (ACC) is a part of the current vehicle assistance system, and setting the vehicle speed of the vehicle is one of the links.

In Patent Document 1 (Japanese Patent Application Laid Open No. 2018-47718) of the prior art, the speed limit is set to the target vehicle speed by long pressing the adjustment switch of the ACC. However, although long pressing is effective in the case of lever type and switch type, how to accept the driver's operation in the case of wheel type has not been taken into account so far.

However, in autonomous driving technology, how to smoothly set the vehicle speed is an issue. In order to solve the above-mentioned problems, the disclosure aims to improve the operability of vehicle speed setting and in turn contribute to the development of sustainable conveyor systems.

SUMMARY

The disclosure can solve the above-mentioned problems by making a setting of a vehicle speed easier to operate through a vehicle speed of a set stopping point.

According to an embodiment of the disclosure, a vehicle control device is provided, which includes: an input part, configured to change a setting of a speed of a vehicle through a rotation operation of a driver; and a control part, configured to change the speed of the vehicle based on an input result of the input part. When the input result of the input part is greater than or equal to a prescribed time, or greater than or equal to a prescribed speed, or greater than or equal to a prescribed amount, the control part changes a vehicle speed to a second speed set to a vehicle speed greater than or equal to a first speed.

DESCRIPTION OF THE EMBODIMENTS

Figure 1:
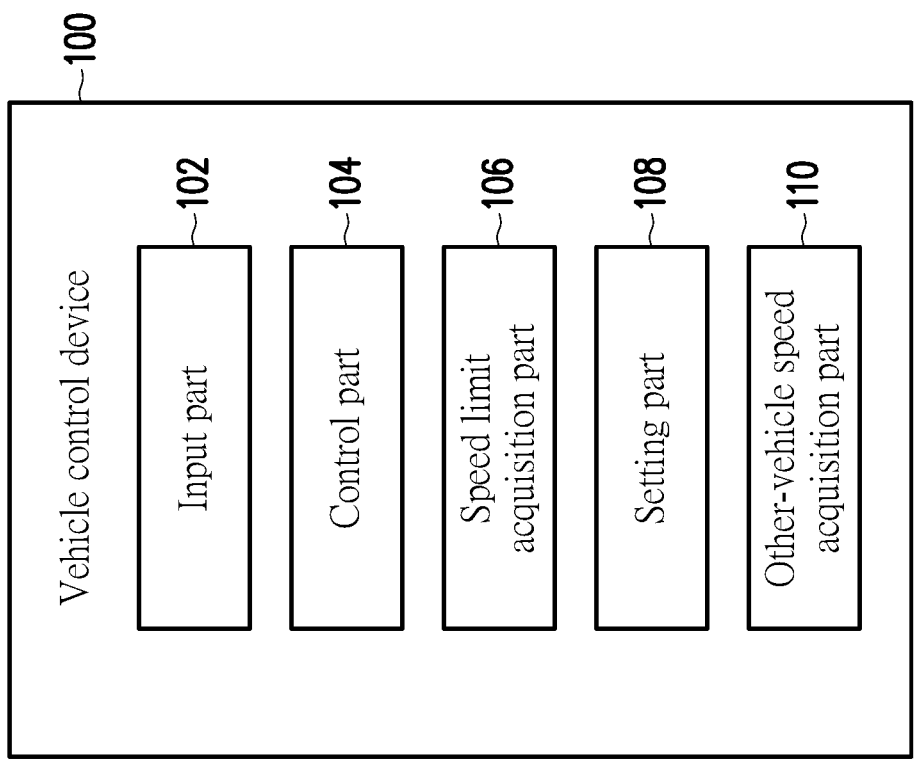
FIG. 1 is a schematic block diagram of a vehicle control device according to an embodiment of the disclosure.

According to an embodiment of the disclosure, in the vehicle control device, when the input result of the input part is less than the prescribed time, or less than the prescribed speed, or less than the prescribed amount, the control part changes the vehicle speed to the first speed.

According to an embodiment of the disclosure, the vehicle control device further includes: a speed limit acquisition part, configured to acquire a speed limit of a road on which the vehicle travels. The second speed is set at the speed limit.

According to an embodiment of the disclosure, the vehicle control device further includes: a setting part. The driver can set the vehicle to an arbitrary speed. The second speed is set to the arbitrary speed.

According to an embodiment of the disclosure, the vehicle control device further includes: an other-vehicle speed acquisition part, configured to acquire a vehicle speed of a preceding vehicle traveling in front of the vehicle. The second speed is a speed set to the vehicle speed of the preceding vehicle, or set to the vehicle speed of the preceding vehicle plus the prescribed speed.

According to an embodiment of the disclosure, the vehicle control device further includes: the speed limit acquisition part, configured to acquire the speed limit of the road on which the vehicle travels. When the speed limit exists between the current speed of the vehicle and the second speed, the speed limit is set to the second speed.

According to an embodiment of the disclosure, in the vehicle control device, when a value from the current speed of the vehicle to the second speed is less than half of the second speed, the next second speed is set.

Reference will now be made in detail to the present preferred embodiments of the disclosure, examples of which are illustrated in the accompanying drawings. Whenever possible, the same reference numbers are used in the drawings and description to refer to the same or like parts.

FIG. 1 is a schematic block diagram of a vehicle control device according to an embodiment of the disclosure. As shown in FIG. 1, a vehicle control device 100 includes at least but is not limited to: an input part 102, a control part 104, a speed limit acquisition part 106, a setting part 108, and an other-vehicle speed acquisition part 110.

The input part 102 is configured to change the setting of the speed of the vehicle through the rotation operation of the driver. The input part 102 is, for example, a roller-type operation switch (see the example shown in FIG. 2). The driver can set the vehicle speed by rotating the roller. As an example, the driver can operate the roller operation switch as the input part 102 to change or set the speed of the vehicle.

The roller-type operation switch as the input part 102 may be disposed, for example, on a dashboard of the vehicle at a position that is easily operated by the driver, or may be disposed on the steering wheel.

The control part 104 is configured to control the vehicle. The control part 104 can control various behavior modes of the vehicle, such as vehicle speed setting, execution of ACC control, acceleration and deceleration, parking, avoidance, various vehicle auxiliary control systems, etc. For those skilled in the art, various control methods of the control part 104 can be designed according to actual requirements.

The control part 104 may be implemented by a processor, such as an electronic control unit (ECU) of a self vehicle V. The ECU can be configured to control various sensors and detectors of the vehicle. As a result, the control part 104 can receive data, perform various processes on the data, and then control various actuating components of the self vehicle. Various system controls in the car are controlled by the ECU, such as starting of the vehicle, inspection of various parts after starting, controlling of the vehicle display, etc.

In the embodiment, the control part 104 can change the speed of the vehicle based on the input result (setting result) of the input part 104.

Figure 2:
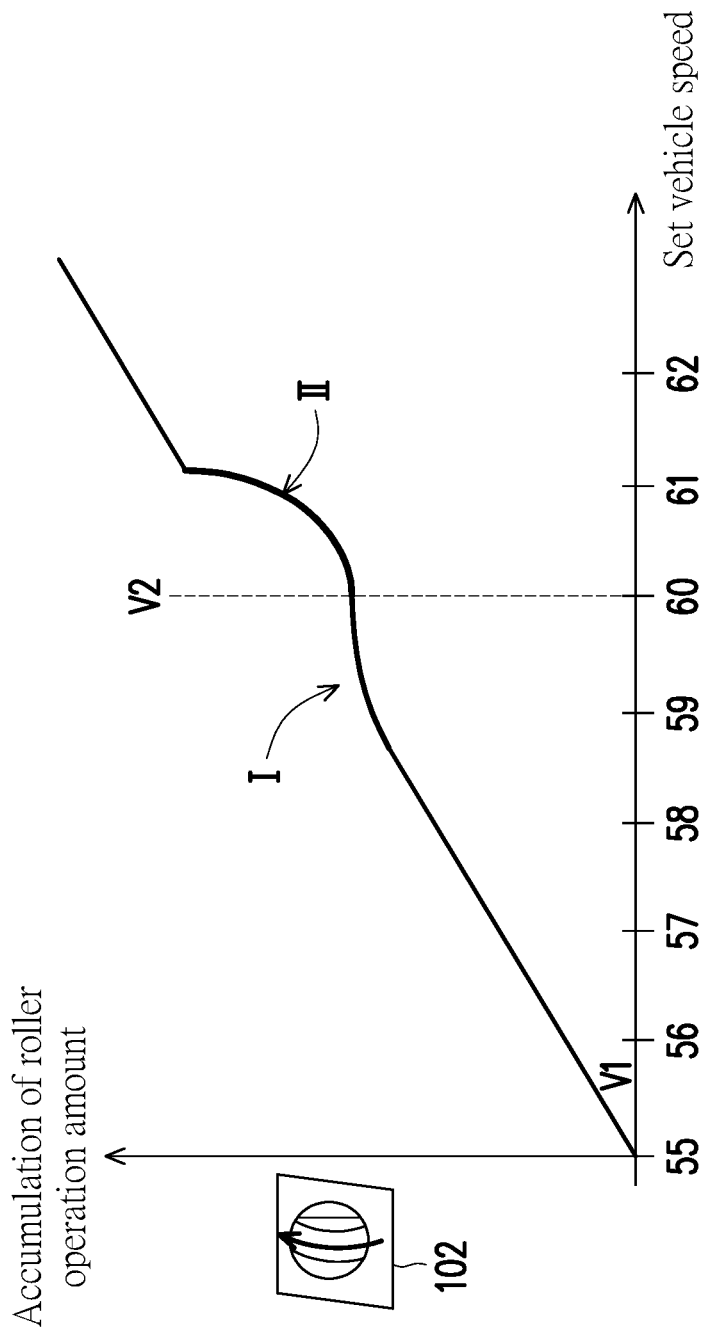
FIG. 2 is a schematic diagram of an operation mode according to an embodiment of the disclosure.

FIG. 2 is a schematic diagram of an operation mode according to an embodiment of the disclosure. As shown in FIG. 2, the vertical axis represents the accumulated value of the operation amount of the input part (the roller-type operation switch) 102, and the horizontal axis represents the speed of the vehicle (set speed). The driver can operate (scroll) the input part 102 in a specified direction, for example, scroll the input part 102 upward to set the vehicle speed of the vehicle. In addition, the control part 104 may detect the operation amount of the input part, such as a prescribed amount, a prescribed speed, a prescribed time, etc. of operating the input part 102.

When the driver scrolls the input part 102 at a slower speed, the control part 104 changes the vehicle speed to a first speed V1. For example, as shown in FIG. 2, if the current vehicle speed of the vehicle is 55 mph, when the control part 104 detects an operation less than or equal to a prescribed amount, a prescribed speed, or a prescribed time, such as when the driver scrolls the input part at a slow speed, the control part 104 will change the vehicle speed to the first speed V1, for example, from 55 mph to 56 mph, so that in this way, the driver can gradually increase the speed of the vehicle.

In addition, when the input result of the input part 102 (i.e., the operation amount of the roller) is greater than or equal to the prescribed time, or greater than or equal to the prescribed speed, or greater than or equal to the prescribed amount, that is, the driver operates (scrolls) the input part 102 at a faster speed, the control part 104 can directly change the speed of the vehicle to a second speed V2 to serve as a good stopping point. The second speed V2 is a vehicle speed set greater than or equal to the first speed. In this example, the second speed V2 is set to 60 mph, which is a good speed (I) for easy entry. When the speed is exceeded, it is difficult for the vehicle speed to increase from the second speed (area II). That is, even if the input part 102 is continuously scrolled, it is difficult to increase the speed from 60 mph to 61 mph.

It should be noted that after a series of operations, when the driver sets the vehicle at 60 mph (the second speed V2) and drives the vehicle, but then the driver wants to increase the vehicle speed from 60 mph, the more direct response will be lost. Such is the advantage of the roller-type operation switch.

Therefore, according to the embodiment, when adjusting the vehicle speed through the input part (the roller-type operation switch) 102, it may be difficult to stop the vehicle speed of the vehicle at a good speed. However, through the simple operation of the disclosure, the vehicle speed of the vehicle can be stopped at a speed of a good stopping point.

According to an embodiment of the disclosure, the vehicle control device 100 may further include a speed limit acquisition part. The speed limit acquisition part 106 is configured to acquire the speed limit of the road on which the vehicle travels. As an example, a traffic sign recognition (TSR) function of the vehicle can be configured to capture the environment on the road using a camera installed in front of the vehicle. Thereafter, signs, markings, etc. disposed on the road are analyzed through the control part 104 or other image processing devices to acquire the vehicle speed limit of the road. In addition, it is also possible to acquire the current position of the vehicle using the navigation device through the pre-stored speed limit of the vehicle in the navigation device, and then acquire the vehicle speed limit of the road.

In this case, the control part 104 sets the second speed to the speed limit or to the speed limit plus a prescribed value, that is, a good stopping point is set according to the speed limit of the road. Therefore, when the control part 104 detects that the operation of the input part 102 is greater than or equal to a prescribed amount, a prescribed speed, or a prescribed time, for example, when the driver scrolls the input part 102 at a faster speed, the control part 104 changes the vehicle speed to the speed limit serving as the second speed V2.

Figure 3:
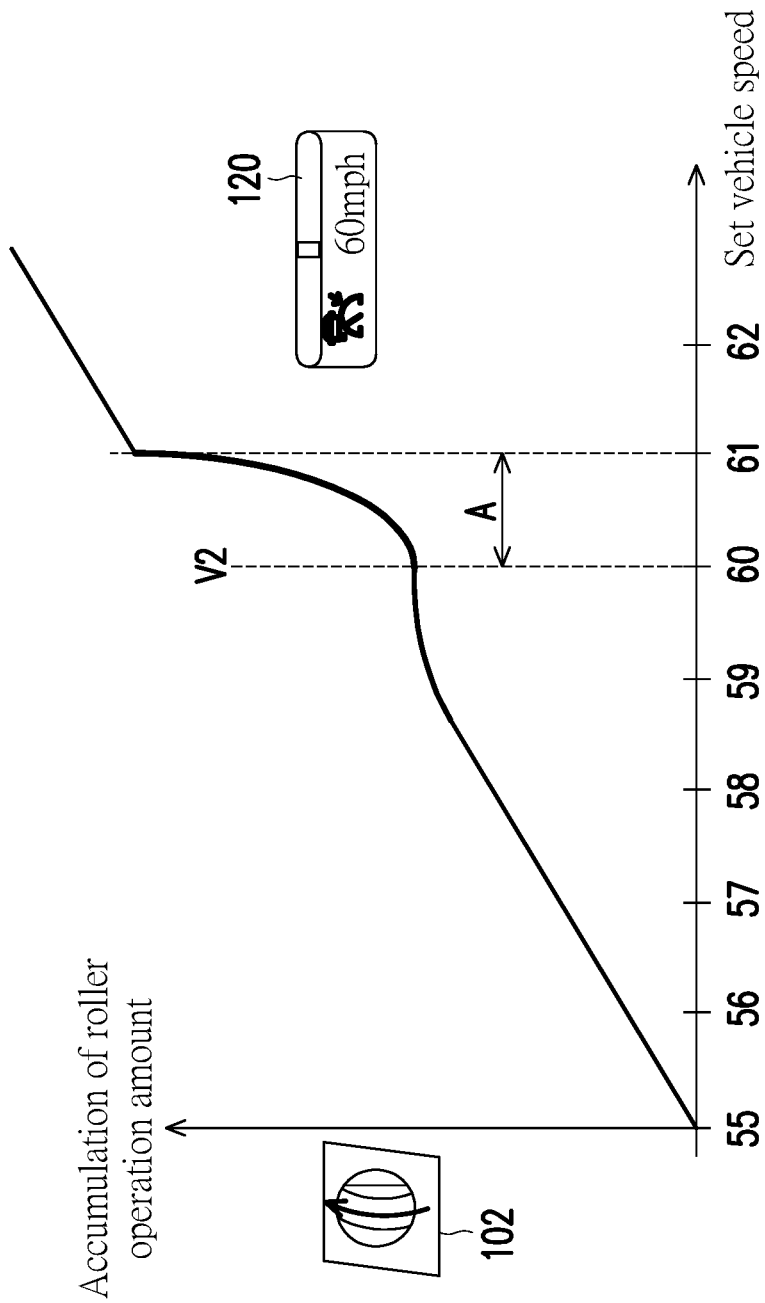
FIG. 3 is a schematic diagram of an operation mode according to another embodiment of the disclosure.

As shown in the scenario example in FIG. 3, assume that the current vehicle speed of the vehicle is set at 55 mph, and the driver sets a good stopping point at the speed limit plus the prescribed value (10 mph in this example) through the customized method of the TSR function. Therefore, when the control part 104 detects an operation greater than or equal to a prescribed amount, a prescribed speed, or a prescribed time (for example, the input part 102 is operated at a faster speed, and the operation amount of the input part 102 is larger), the control part 104 can directly set the vehicle speed of the vehicle to 60 mph.

In addition, when the driver still wants to operate the input part 102 to increase the vehicle speed, at this time the good stopping point has been exceeded. In the area A, even if the driver operates the input part 102, it is also difficult for the control part 104 to increase the vehicle speed from 60 mph. At this time, the control part 104 may, for example, remind the driver by lighting up a speed setting display part 120 on the vehicle dashboard.

Therefore, in the embodiment, the disclosure allows the control part 104 to set the second speed as the speed limit of the road by simply operating the input part (the roller-type operation switch) 102.

Furthermore, when there is a speed limit between the second speeds, by setting the speed limit to the second speed, the vehicle can travel in accordance with the traffic speed of surrounding vehicles.

According to an embodiment of the disclosure, the vehicle control device 100 may further include the setting part 108. The setting part 108 allows the driver to set the speed of the vehicle to an arbitrary speed. In this case, the control part 104 can set the second speed V2 to the arbitrary vehicle speed set by the driver, that is, a good stopping point is an arbitrary vehicle speed set by the driver. Therefore, when the control part 104 detects that the operation of the input part 102 is greater than or equal to a prescribed amount, a prescribed speed, or a prescribed time, for example, when the driver scrolls the input part 102 at a faster speed, the control part 104 changes the vehicle speed to the vehicle speed set by the driver to serve as the second speed V2.

According to the embodiment, the control part 104 can set the second speed to the vehicle speed set by the driver by simply operating the input part (the roller-type switch) 102.

According to an embodiment of the disclosure, the vehicle control device 100 may further include the other-vehicle speed acquisition part 110. The other-vehicle speed acquisition part 110 is configured to acquire the vehicle speed of the preceding vehicle traveling in front of the vehicle. The other-vehicle speed acquisition part 110 may be composed of, for example, a camera, a sonar, or a lidar, and is configured to detect the conditions surrounding the vehicle, and in particular, may acquire the vehicle speed of the preceding vehicle traveling in front of the vehicle.

In the embodiment, the above-mentioned second speed is set to a vehicle speed V of the preceding vehicle, or to a vehicle speed V of a preceding vehicle plus a prescribed speed α (that is, set to V+α).

In the embodiment, in order to continue to follow the preceding vehicle, the vehicle speed of the vehicle must be set to the vehicle speed V of the preceding vehicle. In addition, in order to prevent the preceding vehicle from slightly accelerating and increasing the distance between the vehicles, the vehicle speed of the vehicle must be set to the vehicle speed V of the preceding vehicle or plus the prescribed speed α so as to serve as a good stopping point.

Figure 4:
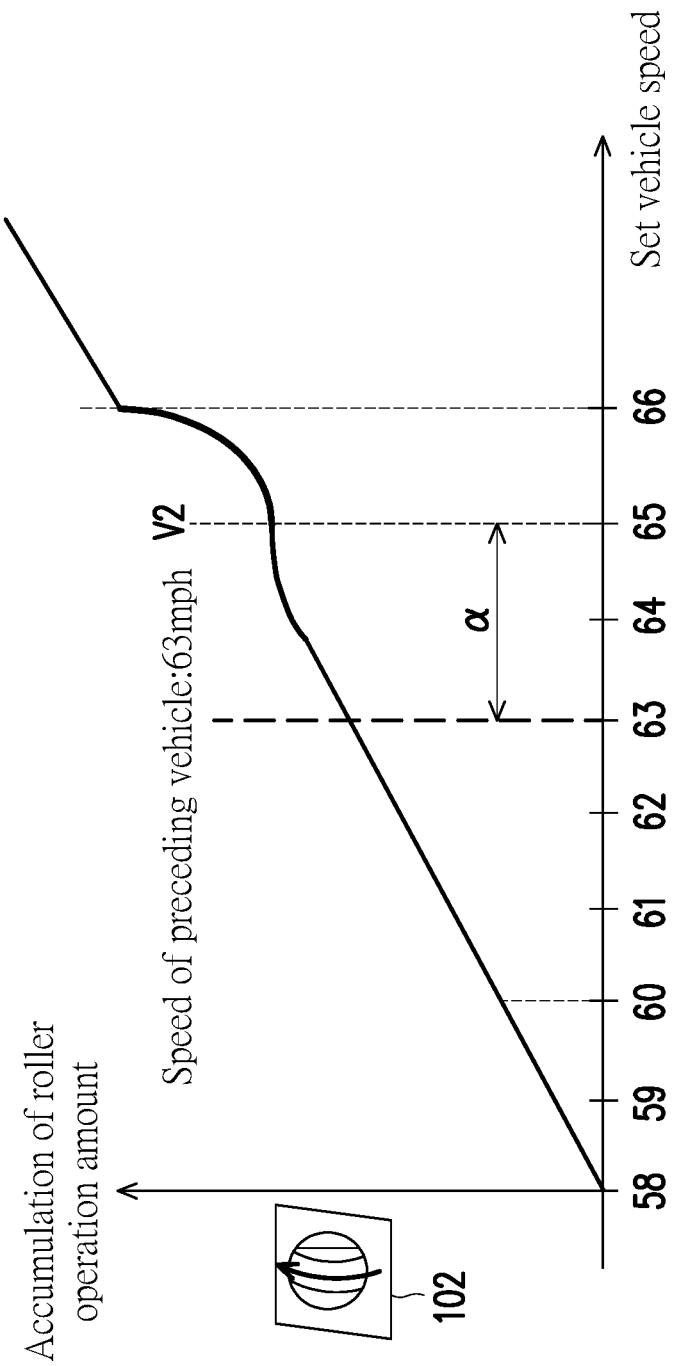
FIG. 4 is a schematic diagram of an operation mode according to another embodiment of the disclosure.

As shown in the operation example of FIG. 4, assuming that the current speed of the vehicle is 58 mph, the other-vehicle speed acquisition part 110 acquires, for example, the vehicle speed of the preceding vehicle, which is 63 mph. At this time, the control part 104 sets the second speed V2 to the vehicle speed V of the preceding vehicle (=63 mph) plus the prescribed speed α (=2 mph). In this example, the input part 102 is not operated to "easily enter 60 mph" but easily enter a good stopping point of 65 mph (i.e., V+α). Therefore, in this example, the control part 104 sets the second speed V2 to 65 mph. When the control part 104 detects that the operation of the input part 102 is greater than or equal to a prescribed amount, a prescribed speed, or a prescribed time, the control part 104 changes the vehicle speed to the second speed V2.

Therefore, in the embodiment, the control part 104 can set the second speed to the vehicle speed V of the preceding vehicle, or to the vehicle speed V+α, by simply operating the input part (the roller-type switch) 102. In this way, the control part 104 can allow the vehicle to follow the preceding vehicle.

In one case, when the value from the current speed of the vehicle to the second speed V2 is less than half of the second speed, the next good stopping point (the next second speed) is set. In other words, if the difference between the current vehicle speed and the second speed is closer, the control part 104 may set the current good stopping point to the next good stopping point.

According to the embodiment, the disclosure can set the second speed to the next second speed in one operation, so the operation convenience for the driver can be improved.

In addition, when using an independent switch (such as a +/− button) or a toggle lever to set the vehicle speed in the prior art, there is a problem of inconvenience in operation. For example, when the driver wants to adjust the vehicle speed from 59 mph to 65 mph, it must first stop at a vehicle speed of the so-called good stopping point (for example, 60 mph). Therefore, when the driver operates the independent switch or toggle lever for the first time, the vehicle speed will first increase from 59 mph and stop at 60 mph, and then the second operation will increase the vehicle speed from 60 mph to 65 mph. In other words, under such an operation mode, even if the driver long presses the button or presses the button hard, the vehicle speed will first stop at 60 mph, and then a second operation is performed to set the vehicle speed to the desired speed. Therefore, in the existing technical method, a two-time operation is necessary.

Using existing operating elements, only 0/1 information of "whether there is input" can be acquired for each input. If it is a roller-type operation switch, the control part 104 can acquire the "input operation amount (rotation amount)" and the "time it takes for one finger movement". Therefore, from these pieces of information, the control part 104 can deduce the "input speed" of the input part and the like.

According to an embodiment of the disclosure, the second speed may be set at 65 mph. When the driver operates the input part 102, if the driver's operation amount in one operation is large and the operation speed is fast, that is, when the control part 104 detects that the operation of the input part 102 is greater than or equal to a prescribed amount, a prescribed speed, or a prescribed time, the control part 104 can set the vehicle speed to the speed of the good stopping point (the second speed V2, in this example, 65 mph).

In addition, when the driver operates the input part 102, if the driver's operation amount in one operation is small and the operation speed is low, that is, when the control part 104 detects that the operation of the input part 102 is less than or equal to a prescribed amount, a prescribed speed, or a prescribed time, the control part 104 can set the vehicle speed by increasing the vehicle speed by 1 mph each time.

Therefore, by judging the "operation amount" and "input speed" of the input part 102 or a combination of the two, even in the above scenario, mode switches can be made between increasing the speed in increments of, for example, 1 mph, and increasing the vehicle speed significantly.

Finally, it should be noted that the above embodiments are merely used to illustrate the technical solution of the disclosure, but not to limit the disclosure. Although the disclosure has been described in detail with reference to the embodiments, it should be understood that persons of ordinary skill in the art can still modify the technical solutions recorded in the embodiments or make equivalent substitutions for some or all of the technical features. However, the modifications or substitutions do not cause the essence of the corresponding technical solution to depart from the scope of the technical solution of the embodiments of the disclosure.

What is claimed is:

1. A vehicle control device, comprising:
   an input part, configured to change a setting of a speed of a vehicle through a rotation operation of a driver; and
   a control part, configured to change the speed of the vehicle based on an input result from the input part,
   wherein when the input result of the input part is less than a prescribed time, or less than a prescribed speed, or less than a prescribed amount, the control part changes a vehicle speed with a first speed change amount, and
   when the input result of the input part is greater than or equal to the prescribed time, or greater than or equal to a prescribed speed, or greater than or equal to the prescribed amount, the control part changes a vehicle speed with a second speed change amount set to be greater than or equal to the first speed change amount.

2. The vehicle control device according to claim 1, further comprising:
   a speed limit acquisition part, configured to acquire a speed limit of a road on which the vehicle travels,
   wherein the second speed is set at the speed limit.

3. The vehicle control device according to claim 1, further comprising:
   a setting part, wherein the driver can set the vehicle to an arbitrary speed,
   wherein the second speed is set to the arbitrary speed.

4. The vehicle control device according to claim 1, further comprising:
  an other-vehicle speed acquisition part, configured to acquire a vehicle speed of a preceding vehicle traveling in front of the vehicle,
  wherein the second speed is a speed set to the vehicle speed of the preceding vehicle, or set to the vehicle speed of the preceding vehicle plus the prescribed speed.

5. The vehicle control device according to claim 3, further comprising:
  a speed limit acquisition part, configured to acquire a speed limit of a road on which the vehicle travels,
  wherein when the speed limit exists between a current speed of the vehicle and the second speed, the speed limit is set to the second speed.

6. The vehicle control device according to claim 4, further comprising:
  a speed limit acquisition part, configured to acquire a speed limit of a road on which the vehicle travels,
  wherein when the speed limit exists between a current speed of the vehicle and the second speed, the speed limit is set to the second speed.

7. The vehicle control device according to claim 1, wherein
  when a value from a current speed of the vehicle to the second speed is less than half of the second speed, a next second speed is set.

* * * * *